(12) United States Patent
Albertus et al.

(10) Patent No.: US 9,935,331 B2
(45) Date of Patent: Apr. 3, 2018

(54) LI/METAL CELL WITH STRUCTURED SURFACE SEPARATOR

(71) Applicant: Robert Bosch GmbH, Stuttgart (DE)

(72) Inventors: Paul Albertus, Washington, DC (US); John F. Christensen, Mountain View, CA (US); Timm Lohmann, Mountain View, CA (US); Boris Kozinsky, Waban, MA (US)

(73) Assignee: Robert Bosch GmbH, Stuttgart (DE)

( * ) Notice: Subject to any disclaimer, the term of this patent is extended or adjusted under 35 U.S.C. 154(b) by 429 days.

(21) Appl. No.: 14/459,789

(22) Filed: Aug. 14, 2014

(65) Prior Publication Data

US 2016/0365601 A1   Dec. 15, 2016

Related U.S. Application Data

(60) Provisional application No. 61/866,241, filed on Aug. 15, 2013.

(51) Int. Cl.
*H01M 10/0525* (2010.01)
*H01M 2/18* (2006.01)
*H01M 10/052* (2010.01)
*H01M 2/16* (2006.01)
*H01M 4/58* (2010.01)
*H01M 4/62* (2006.01)
(Continued)

(52) U.S. Cl.
CPC ..... *H01M 10/0525* (2013.01); *H01M 2/1613* (2013.01); *H01M 2/1673* (2013.01); *H01M 2/18* (2013.01); *H01M 4/5825* (2013.01); *H01M 4/623* (2013.01); *H01M 4/625* (2013.01); *H01M 4/661* (2013.01); *H01M 10/052* (2013.01); *H01M 10/058* (2013.01); *Y02T 10/7011* (2013.01)

(58) Field of Classification Search
CPC .......... H01M 2/14; H01M 2/145; H01M 2/18
See application file for complete search history.

(56) References Cited

U.S. PATENT DOCUMENTS

| 4,490,447 A | * | 12/1984 | Battersby | ............. | H01M 2/145 |
| | | | | | 429/143 |
| 5,981,107 A | * | 11/1999 | Hamano | ................ | H01M 4/04 |
| | | | | | 429/129 |
| 2007/0172735 A1 | * | 7/2007 | Hall | ..................... | H01M 2/021 |
| | | | | | 429/233 |

FOREIGN PATENT DOCUMENTS

| JP | 2010108802 A | 5/2010 |
| JP | 2011060539 A | 3/2011 |
| JP | 2013137984 A | 7/2013 |

(Continued)

OTHER PUBLICATIONS

International Search Report and Written Opinion corresponding to PCT Application No. PCT/US2014/051103, dated Nov. 24, 2014 (11 pages).

(Continued)

*Primary Examiner* — Alix Eggerding
(74) *Attorney, Agent, or Firm* — Maginot, Moore & Beck LLP

(57) ABSTRACT

An electrochemical cell in one embodiment includes an anode including a form of lithium, a cathode including an active material which intercalates lithium, and a separator positioned between the anode and the cathode, the separator including a first structured surface portion positioned in opposition to the anode, the first structured surface portion having a non-planar profile in aggregate.

9 Claims, 4 Drawing Sheets

(51) Int. Cl.
*H01M 4/66* (2006.01)
*H01M 10/058* (2010.01)

(56) References Cited

FOREIGN PATENT DOCUMENTS

KR  10-20060132556 A  12/2006
KR  10-20130084545 A  7/2013

OTHER PUBLICATIONS

Christensen J. et al., "A Critical Review of Li/air Batteries", Journal of the Electrochemical Society, 2012. 159(2): p. R1-R30.

Amatucci, G.G. et al., "Fluoride based electrode materials for advanced energy storage devices", Journal of Fluorine Chemistry, 2007. 128(4): p. 243-262.

Cabana, J. et al., "Beyond Intercalation-Based Li-Ion Batteries: The State of the Art and Challenges of Electrode Materials Reacting Through Conversion Reactions", Advanced Materials, 2010. 22(35): p. E170-E192.

USABC Goals for Advanced Batteries for EVs. 2002, United States Advanced Battery Consortium. http://www.uscar.org/commands/files_download.php?files_id=27.

Ogasawara, T. et al., "Rechargeable Li2O2 Electrode for Lithium Batteries", Journal of the American Chemical Society, 2006. 128(4): p. 1390-1393.

Abraham, K.M. et al., "A polymer electrolyte-based rechargeable lithium/oxygen battery", Journal of the Electrochemical Society, 1996. 143(1): p. 1-5.

Zheng, J. et al., "Theoretical Energy Density of Li-Air Batteries", Journal of the Electrochemical Society, 2008. 155(6): p. A432-A437.

Beattie, S. et al., "High-Capacity Lithium-Air Cathodes", Journal of the Electrochemical Society, 2009. 156: p. A44-A47.

Kumar, B. et al., "A Solid-State, Rechargeable, Long Cycle Life Lithium-Air Battery", Journal of the Electrochemical Society, 2010. 157: p. A50-A54.

Read, J., "Characterization of the lithium/oxygen organic electrolyte battery", Journal of the Electrochemical Society, 2002. 149: p. A1190-A1195.

Read, J. et al., "Oxygen transport properties of organic electrolytes and performance of lithium/oxygen battery", Journal of the Electrochemical Society, 2003. 150: p. A1351-A1356.

Yang, X. et al., "The effect of oxygen pressures on the electrochemical profile of lithium/oxygen battery", Journal of Solid State Electrochemistry:, 2010 (14), p. 109-114.

\* cited by examiner

LI/METAL CELL WITH STRUCTURED SURFACE SEPARATOR

CROSS REFERENCE

This application claims the benefit of U.S. Provisional Application No. 61/866,241 filed Aug. 15, 2013, the entire contents of which is herein incorporated by reference.

FIELD OF THE DISCLOSURE

The present disclosure relates to batteries and more particularly to lithium-metal batteries.

BACKGROUND

Batteries are a useful source of stored energy that can be incorporated into a number of systems. Rechargeable lithium-ion ("Li-ion") batteries are attractive energy storage systems for portable electronics and electric and hybrid-electric vehicles because of their high specific energy compared to other electrochemical energy storage devices. In particular, batteries with a form of lithium metal incorporated into the negative electrode afford exceptionally high specific energy (measured in Wh/kg) and energy density (measured in Wh/L) compared to batteries with conventional carbonaceous negative electrodes.

When high-specific-capacity negative electrodes such as lithium are used in a battery, the maximum benefit of the capacity-increase over conventional systems is realized when a high-capacity positive electrode active material is also used. Conventional lithium-intercalating oxides (e.g., $LiCoO_2$, $LiNi_{0.8}Co_{0.15}Al_{0.05}O_2$, and $Li_{1.1}Ni_{0.3}Co_{0.3}Mn_{0.3}O_2$) are typically limited to a theoretical capacity of ~280 mAh/g (based on the mass of the lithiated oxide) and a practical capacity of 180 to 250 mAh/g. In comparison, the specific capacity of lithium metal is about 3863 mAh/g. The highest theoretical capacity achievable for a lithium-ion positive electrode is 1168 mAh/g (based on the mass of the lithiated material), which is shared by $Li_2S$ and $Li_2O_2$. Other high-capacity materials including $BiF_3$ (303 mAh/g, lithiated) and $FeF_3$ (712 mAh/g, lithiated) are identified in Amatucci, G. G. and N. Pereira, *Fluoride based electrode materials for advanced energy storage devices.* Journal of Fluorine Chemistry, 2007. 128(4): p. 243-262. All of the foregoing materials, however, react with lithium at a lower voltage compared to conventional oxide positive electrodes, hence limiting the theoretical specific energy. The theoretical specific energies of the foregoing materials, however, are very high (>800 Wh/kg, compared to a maximum of ~500 Wh/kg for a cell with lithium negative and conventional oxide positive electrodes).

Thus the advantage of using a Li metal negative electrode (sometimes referred to as an anode) is the much higher energy density of the entire cell, as compared to cells with graphitic or other intercalation negative electrode. A disadvantage of using pure Li metal is that lithium is highly reactive. Accordingly, the lithium metal has a propensity to undergo morphology changes, which cause structures having a high surface area to form on and around the negative electrode when the cell is being charged. Exemplary high surface area structures include dendrites and mossy structures.

Dendrites are the most common failure mode for cells with Li metal anodes. The dendrites form with a needle-like structure and can grow through the separator during charging of the cell, resulting in an internal short. "Soft shorts" that burn out rapidly result in a temporary self-discharge of the cell, while "strong shorts" consisting of a higher, more stable contact area can lead to complete discharge of the cell, cell failure, and even thermal runaway. While dendrites typically grow through the separator during charge, shorts can also develop during discharge depending on the external pressure placed on the cell and/or internal volume changes that occur in both the negative and positive electrodes.

Because Li metal is highly electronically conductive, the surface of the Li tends to roughen as the metal is plated and stripped. Peaks in the surface grow as dendrites during charge. During discharge, some smoothing of the dendrites occurs. Nonetheless, there is typically some roughness that remains at the end of discharge. Depending on the depth of discharge, the overall roughness can be amplified from one cycle to the next. Because the metal is essentially at the same electrochemical potential throughout, potential and, to a lesser extent, concentration gradients in the electrolyte phase drive the change in morphology.

Related to dendrite initiation and growth is development of the Li morphology, which tends to increase the electrode surface area with cycling and consumes solvent to generate fresh passivation layers. Formation of high-surface-area mossy Li tends to occur during low-rate deposition from a liquid electrolyte, especially if the salt concentration is high. The high surface area combined with high reactivity of Li and flammability of the organic solvent makes for a very reactive and dangerous cell.

Another significant challenge in realizing a commercially viable battery incorporating a Li metal anode is the presence of a planar Li metal surface in the anode that has a reduced interfacial area for reaction compared with a porous electrode, where small particles are typically used to increase the interfacial area for reaction. For example, FIG. 1 depicts a typical lithium cell 10 which includes an anode 12, a cathode 14 with an aluminum current collector 16, and a separator structure 18. A current collector 20 is included for the anode 12. The interface between the anode 12 and the separator 18 is planar.

In contrast to the configuration of FIG. 1, a porous electrode composed of spherical particles with a diameter of 6 microns with a volume fraction of 50% has an interfacial area for reaction of 50 $cm^2$ per 100 μm of electrode thickness per $cm^2$ of geometrical area. The increase in interfacial area for reaction helps to reduce the total resistance of the cell, and thereby increase the amount of power that it can deliver.

Accordingly, while a typical porous electrode has about 50 $cm^2$ of interfacial area available for reaction per 100 μm of electrode thickness per $cm^2$ of geometrical area, the planar electrode 12 only has 1/50th the interfacial area of a porous electrode for reaction. Consequently, the cell 10 requires a kinetic rate constant that is about 50 times as high as a cell including a porous anode to achieve the same kinetic resistance as the porous anode. Especially for solid-state cells making use of Li metal and a solid separator, the Li metal/separator interface is a solid/solid interface, and the kinetics of Li transfer through that interface are slow compared with a Li metal/liquid organic electrolyte interface.

What is therefore needed is an electrochemical cell including a form of lithium in the anode which exhibits reduced kinetic resistance.

BACKGROUND

In accordance with one embodiment, an electrochemical cell includes an anode including a form of lithium, a cathode including an active material which intercalates lithium, and a separator positioned between the anode and the cathode, the separator including a first structured surface portion positioned in opposition to the anode, the first structured surface portion having a non-planar profile in aggregate.

In one or more embodiments, the separator has a first nominal width, the first structured surface portion defines a second nominal width, and the second nominal width is less than about 20 percent of the first nominal width.

In one or more embodiments the first nominal width is about 25 microns, and the second nominal width is about 5 microns.

In one or more embodiments, a separator includes a second structured surface portion positioned in opposition to the cathode, the second structured surface portion having a non-planar profile in aggregate.

In one or more embodiments a separator has a first nominal width, the first structured surface portion defines a second nominal width, the second structured surface portion defines a third nominal width, and a sum of the second nominal width and the third nominal width is less than about 20 percent of the first nominal width.

In one or more embodiments the first structured surface portion is uniformly structured, and the second structured surface portion is uniformly structured.

In one or more embodiments the first structured surface portion includes a plurality of first surfaces angled with respect to each other, and the second structured surface portion includes a plurality of second surfaces angled with respect to each other.

In one or more embodiments each of the plurality of first surfaces is separated from another of the plurality of first surfaces by a rounded corner portion, and each of the plurality of second surfaces is separated from another of the plurality of second surfaces by a rounded corner portion.

In one or more embodiments each of the plurality of first surfaces is associated with a respective one of the plurality of second surfaces located directly across the width of the separator, and a straight line distance from each of the plurality of first surfaces to the associated one of the plurality of second surfaces is the same distance as a parallel straight line distance between each of the other of the plurality of first surfaces to the associated one of the plurality of second surfaces.

In one or more embodiments each of the first structured surface portion and the second structured surface portion are irregularly textured.

In one embodiment, a method of forming an electrochemical cell includes providing an anode including a form of lithium, providing a cathode including an active material which intercalates lithium, forming a separator portion, forming a first structured surface portion of the separator portion, the first structured surface portion having a non-planar profile in aggregate, and positioning the formed separator portion with the first structured surface portion between the anode and the cathode with the first structured surface portion in opposition to the anode.

In one or more embodiments forming the separator portion comprises forming the separator portion with a first nominal width, and forming the first structured surface portion comprises forming the first structured surface portion with a second nominal width, wherein the second nominal width is less than about 20 percent of the first nominal width.

In one or more embodiments a method of forming an electrochemical cell includes forming a second structured surface portion, the first structured surface portion having a non-planar profile in aggregate, wherein positioning the formed separator portion between the anode and the cathode comprises positioning the second structured surface portion in opposition to the cathode.

In one or more embodiments forming the first structured surface portion comprises uniformly structuring the first structured surface portion, and forming the second structured surface portion comprises uniformly structuring the second structured surface portion.

In one or more embodiments forming the first structured surface portion comprises forming a plurality of first surfaces angled with respect to each other, and forming the second structured surface portion comprises forming a plurality of second surfaces angled with respect to each other.

In one or more embodiments forming the first structured surface portion comprises separating each of the plurality of first surfaces from another of the plurality of first surfaces with a rounded corner portion, and forming the second structured surface portion comprises separating each of the plurality of second surfaces from another of the plurality of second surfaces with a rounded corner portion.

In one or more embodiments forming the second structured surface portion includes forming each of the plurality of second surfaces directly across the width of the formed separator portion from an associated one of the plurality of first surfaces, such that a straight line distance from each of the plurality of first surfaces to the associated one of the plurality of second surfaces is the same distance as a parallel straight line distance between each of the other of the plurality of first surfaces to the associated one of the plurality of second surfaces.

In one or more embodiments forming the first structured surface portion comprises scraping a first outer surface of the formed separator portion to form an irregular texture on the first outer surface, and forming the second structured surface portion comprises scraping a second outer surface of the formed separator portion to form an irregular texture on the second outer surface.

In one or more embodiments forming separator portion includes forming the separator portion on a scaffold having a desired surface structure, and releasing the formed separator portion from the scaffolding, such that forming the separator portion comprises forming the first structured surface portion.

In one or more embodiments forming the first structured surface portion includes chemically etching the formed separator portion.

DESCRIPTION

Figure 1:
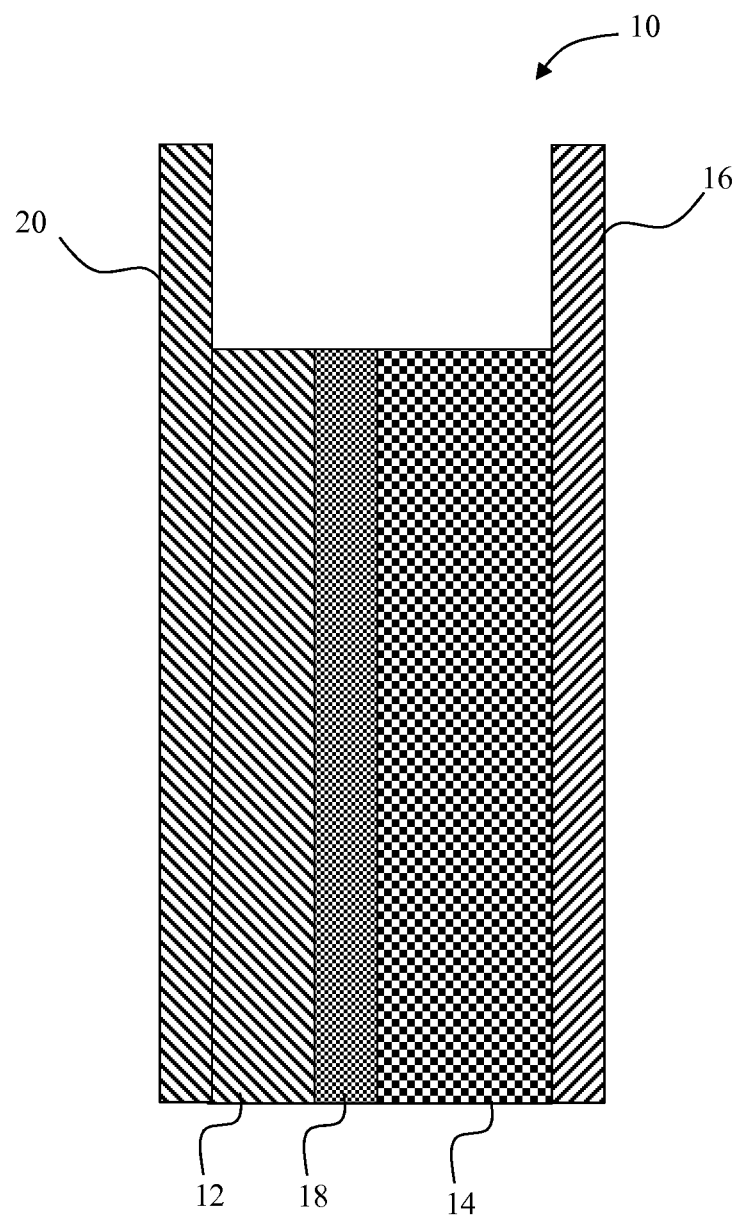
FIG. 1 depicts a simplified schematic of a typical electrochemical cell including a planar anode-to-separator interface.

For the purpose of promoting an understanding of the principles of the disclosure, reference will now be made to the embodiments illustrated in the drawings and described in the following written description. It is understood that no limitation to the scope of the disclosure is thereby intended. It is further understood that the present disclosure includes any alterations and modifications to the illustrated embodiments and includes further applications of the principles of the disclosure as would normally occur to one of ordinary skill in the art to which this disclosure pertains.

Figure 2:
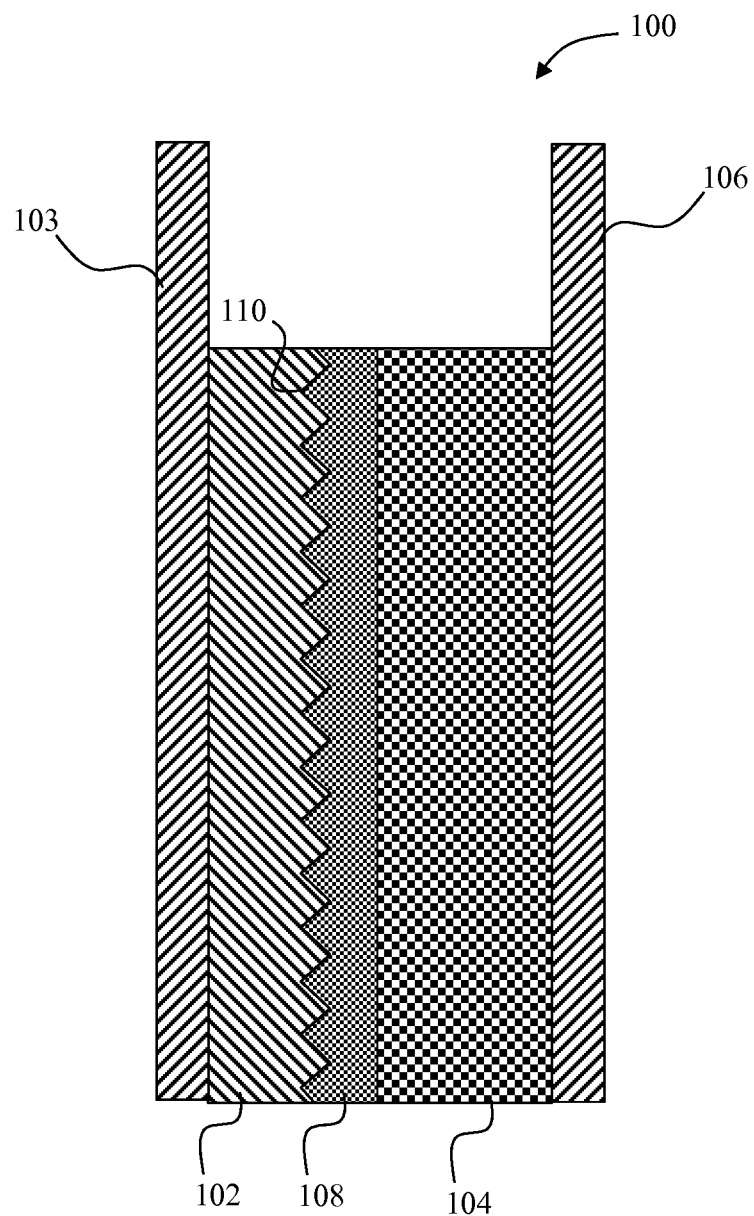
FIG. 2 depicts a simplified schematic of an electrochemical cell including a structured separator surface immediately adjacent to the anode.

FIG. 2 depicts an electrochemical cell 100 which includes an anode 102 with a current collector 103, a cathode 104 with an aluminum current collector 106, and a separator structure 108. The anode 102 includes lithium metal or a lithium alloy metal. The anode 104 is sized such that it has at least as much capacity as the cathode 106, and preferably at least 10% excess capacity and in some embodiments up to 50% excess capacity at beginning of life and full charge to account for Li metal that may be consumed in side reactions that take place during cycling.

The cathode 104 contains an active material (such as a material that intercalates Li like $LiFePO_4$), an electrolyte, and optionally a conductive additive that improves electronic conductivity (such as carbon black) and optionally a binder to improve the coherence of the particles in the cathode (such as PVDF).

The separator structure 108 is a layer that conducts Li ions but not electrons. The separator layer 108 may be composed of a solid ceramic Li conductor (such as a garnet material, $Li_3N$, LiPON, LiSICON, LTAP, sulfides, and others, or a composite solid ceramic that includes both crystalline or glassy ceramics and polymers such those based on polyethylene oxide).

In one embodiment, the separator layer is composed of a solid ceramic layer. The benefit of a solid ceramic layer is that no ionic liquid will be able to penetrate, unlike a polymer in which a small molecule like an ionic liquid can penetrate.

The separator structure 108 includes a structured surface 110 which is immediately adjacent to the anode 102. As used herein, the term "structured surface" means that the surface is non-planar in aggregate. In the embodiment of FIG. 2, the structured surface 110 includes a number of planar surfaces which are joined by 90° angles, each planar surface in opposition to a planar surface of the anode 102. By including the angled planar surfaces, the interfacial area between the anode 102 and the cathode 108 is increased by a factor of the square root of two (1.414). FIG. 2 is not to scale, as the nominal width of the structured surface portion 110 (that is, from one peak to the adjacent valley) is typically much smaller than the nominal width of the separator structure 108. For example, in one embodiment the nominal width of the solid separator, including the nominal width of the structured surface 110, is 25 microns, and the nominal width of the surface structuring is less than 5 microns. Preferably the nominal width of the structured surface 110 is less than 20% of the nominal width of the separator structure 108.

The configuration of FIG. 2 thus results in increased interfacial area between the anode 102 and the separator 108. The use of a structured surface 110 on a single side of the separator 108 in some embodiments, however, may result in a non-uniform current density through the separator 108 because of the non-uniform distance between the anode 102 and the cathode 104. Current follows the path of least resistance, so the current density would be highest at the points of shortest distance between the Li metal anode 102 and the cathode 104. The electrochemical cell 120 of FIG. 3 reduces the non-uniform current density.

The electrochemical cell 120 includes an anode 122 with a current collector 123, a cathode 124 with an aluminum current collector 126, and a separator structure 128. The electrochemical cell 120 is substantially the same as the electrochemical cell 100 differing in that the separator structure 128 includes a first structured surface 130 and an opposite structured surface 132 immediately adjacent to the cathode 124. The straight-line distance between any point on the first structured surface 130 and a corresponding point on the opposite structured surface 132 is the same for every point on the first structured surface 130.

Figure 3:
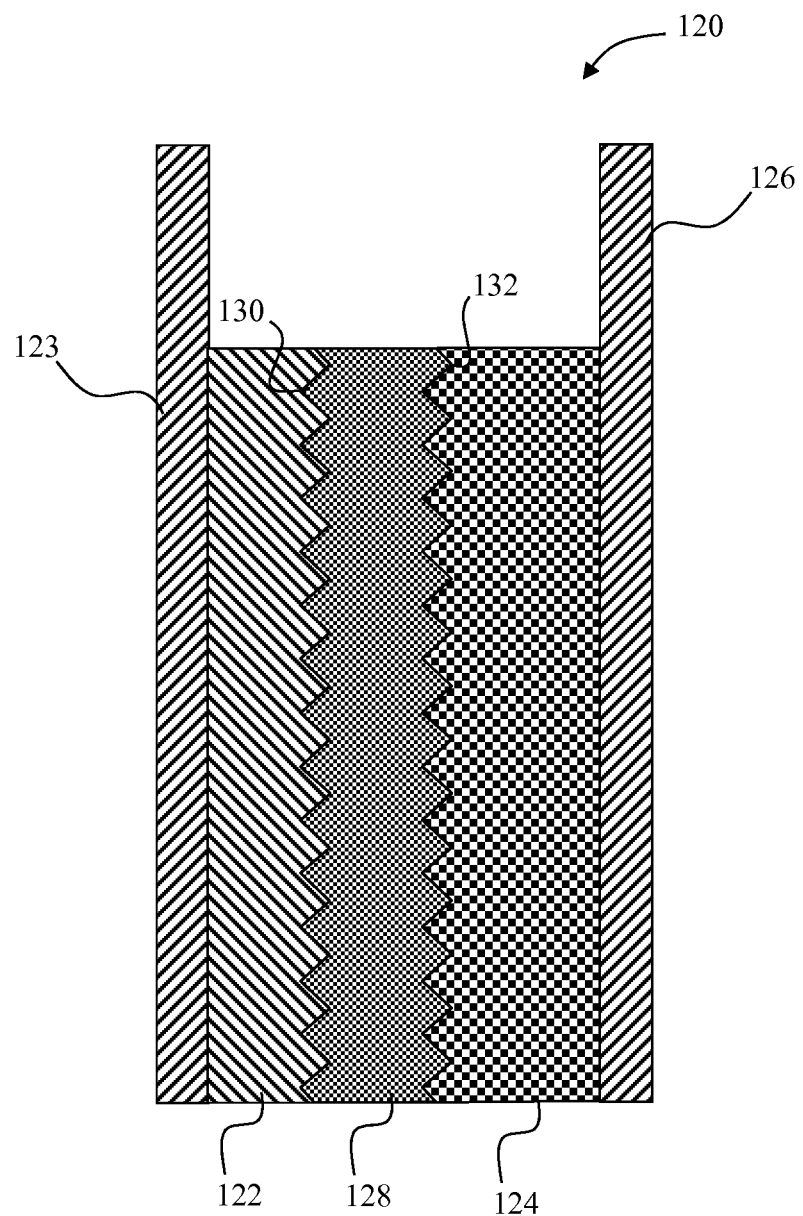
FIG. 3 depicts a simplified schematic of an electrochemical cell including a structured separator surface immediately adjacent to the anode and a structured separator surface immediately adjacent to the cathode.
Figures 4, 5:
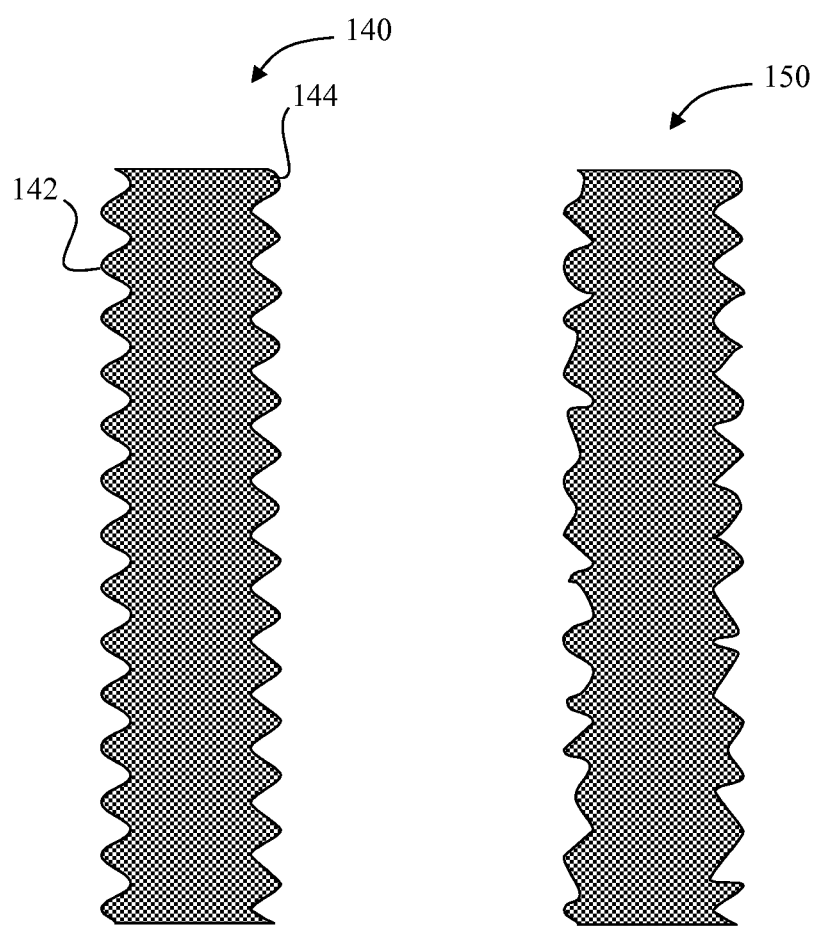
FIG. 4 depicts a simplified schematic of a separator which includes two structured surfaces having rounded structures.
FIG. 5 depicts a simplified schematic of a separator which includes two structured surfaces having irregularly structured surfaces including rounded and pointed structures.

While the embodiments of FIGS. 2 and 3 incorporate structured surfaces with uniformly angled and spaced apart surfaces, other surface structuring shapes and strategies can be realized. For example, FIG. 4 depicts a separator 140 which with continuously rounded structured surfaces 142 and 144. The structured surfaces 142 and 144 in different embodiments are regularly curved or irregularly curved (i.e. differently sized or aligned peaks and valleys).

The benefits of using rounded corners or random structures include increased ease of fabrication. For example, a random structure such as the contoured surface 150 of FIG. 5 may be obtained easily by scraping the surface of a solid separator to introduce an irregularly textured surface structuring. Depending on the fabrication process, rounded edges may be easier to introduce than square or otherwise pointed edges. In addition, a rounded structure typically introduces more interfacial area than square edges. For example, an area enhancement factor of about 1.57 is achieved through the use of a circle compared to the enhancement factor of 1.414 with the use of a 90° angles.

The method of introducing the surface structuring depends on the fabrication process for the particular material, but may include any of the numerous methods used for structuring materials at length scales from 100 nm to 5 microns, including lithography, physical and chemical deposition techniques, and more. Scaffolds may be used for the fabrication from which the solid separator would need to be released, and appropriate interlayers that facilitate the release are used in some embodiments.

In some embodiments, the resulting non-planar piece of Li metal may undergo some plastic deformation as the deposition and removal of Li metal takes place during electrochemical cycling. Accordingly methods facilitating the plastic deformation of Li metal may be employed, such as the use of stiff cell enclosures, rigid cathode structures, and/or the application of compressive pressure on the cell layers.

The above described embodiments introduce surface structuring on the layer adjacent to the Li metal, thereby increasing the area available for interfacial reaction and reducing the interfacial impedance. Numerous types of surface structuring are available, including the use of structuring with sharp corners, rounded corners, and random structures.

The above described embodiments enable Li metal cells, which have a higher energy per mass and volume. Moreover, the above described embodiments provide a high power output and a lower cell resistance compared to cells using Li metal that do not include structured surfaces.

While the disclosure has been illustrated and described in detail in the drawings and foregoing description, the same should be considered as illustrative and not restrictive in character. It is understood that only the preferred embodiments have been presented and that all changes, modifications and further applications that come within the spirit of the disclosure are desired to be protected.

The invention claimed is:

1. A method of forming an electrochemical cell, comprising:
   providing an anode including a form of lithium;
   providing a cathode including an active material which intercalates lithium;
   forming a separator portion with a first nominal width;
   forming a first structured surface portion of the separator portion with a first plurality of protuberances, by uniformly structuring the first structured surface portion, the first structured surface portion having a non-planar profile in aggregate, wherein the first structured surface portion has a second nominal width, and the second nominal width is less than about 20 percent of the first nominal width; and
   positioning the formed separator portion with the first structured surface portion between the anode and the cathode with the first structured surface portion in opposition to the anode such that the first plurality of protuberances are interleaved with a second plurality of protuberances of the anode.

2. The method of claim 1, further comprising:
   forming a second structured surface portion of the separator portion with a third plurality of protuberances, the first structured surface portion having a non-planar profile in aggregate, and wherein:
   positioning the formed separator portion between the anode and the cathode comprises positioning the second structured surface portion in opposition to the cathode such that the third plurality of protuberances are interleaved with a fourth plurality of protuberances of the cathode.

3. The method of claim 2, wherein:
   forming the second structured surface portion with the third plurality of protuberances comprises uniformly structuring the second structured surface portion.

4. The method of claim 3, wherein:
   forming the first structured surface portion with the first plurality of protuberances comprises forming a plurality of first surfaces angled with respect to each other; and
   forming the second structured surface portion with the third plurality of protuberances comprises forming a plurality of second surfaces angled with respect to each other.

5. The method of claim 4, wherein:
   forming the first structured surface portion with the first plurality of protuberances comprises separating each of the plurality of first surfaces from another of the plurality of first surfaces with a rounded corner portion; and
   forming the second structured surface portion with the third plurality of protuberances comprises separating each of the plurality of second surfaces from another of the plurality of second surfaces with a rounded corner portion.

6. The method of claim 4, wherein:
   forming the second structured surface portion with the third plurality of protuberances comprises forming each of the plurality of second surfaces directly across the width of the formed separator portion from an associated one of the plurality of first surfaces, such that a straight line distance from each of the plurality of first surfaces to the associated one of the plurality of second surfaces is the same distance as a parallel straight line distance between each of the other of the plurality of first surfaces to the associated one of the plurality of second surfaces.

7. The method of claim 2, wherein:
   forming the first structured surface portion with the first plurality of protuberances comprises scraping a first outer surface of the formed separator portion to form an irregular texture on the first outer surface; and
   forming the second structured surface portion with the third plurality of protuberances comprises scraping a second outer surface of the formed separator portion to form an irregular texture on the second outer surface.

8. The method of claim 1, wherein forming the separator portion comprises:
   forming the separator portion on a scaffold having a desired surface structure; and
   releasing the formed separator portion from the scaffolding, such that forming the separator portion comprises forming the first structured surface portion.

9. The method of claim 1, wherein forming the first structured surface portion comprises:
   chemically etching the formed separator portion.

* * * * *